United States Patent [19]

Quiogue

[11] Patent Number: 4,543,007

[45] Date of Patent: Sep. 24, 1985

[54] ADJUSTABLE LUMINAIRE SUPPORT KNUCKLE

[75] Inventor: Honesto D. Quiogue, Blacksburg, Va.

[73] Assignee: Harvey Hubbell Incorporated, Orange, Conn.

[21] Appl. No.: 552,621

[22] Filed: Nov. 17, 1983

[51] Int. Cl.[4] .......................... F16C 11/00; F16L 27/00

[52] U.S. Cl. .......................................... 403/97; 403/91; 403/93; 403/146; 285/185; 285/DIG. 8

[58] Field of Search ...................... 403/97, 93, 91, 146; 285/DIG. 8, 185, 282; 362/432, 371, 427

[56] References Cited

U.S. PATENT DOCUMENTS

| | | | |
|---|---|---|---|
| 1,697,710 | 11/1921 | Bostroem | 403/97 |
| 2,434,986 | 1/1948 | Bremer | 285/DIG. 8 X |
| 2,587,917 | 3/1952 | Stone | 285/185 X |
| 3,030,128 | 4/1962 | Versen | 285/282 X |
| 3,208,774 | 9/1965 | Odwazny | 285/DIG. 8 X |
| 3,409,315 | 11/1968 | Wichers et al. | 285/DIG. 8 X |
| 3,507,521 | 4/1970 | Bridgland, Jr. | 285/185 X |
| 3,586,355 | 6/1971 | Etobicoke | 403/91 |
| 3,778,610 | 12/1973 | Wolf | 403/97 X |
| 4,008,910 | 2/1977 | Roche | 285/282 X |
| 4,379,322 | 4/1983 | Kelly | 362/300 |

FOREIGN PATENT DOCUMENTS

| | | | |
|---|---|---|---|
| 113906 | 8/1929 | Austria | 285/185 |

*Primary Examiner*—Cornelius J. Husar

*Assistant Examiner*—Todd G. Williams

*Attorney, Agent, or Firm*—Jerry M. Presson; Walter C. Farley

[57] ABSTRACT

A support knuckle for a luminaire has a first body attached to the luminaire housing and a second body which can be attached to a mounting location. The first body has a recess with peripheral teeth and a passage to the housing interior. The second body has teeth which are matable with those on the first body at various angular positions. The two bodies are held together by a threaded fastener passing through an elastomeric sleeve.

13 Claims, 6 Drawing Figures

ADJUSTABLE LUMINAIRE SUPPORT KNUCKLE

This invention relates to an improved adjustable support for a luminaire of the type known as a knuckle, the support also acting as a wire conduit.

BACKGROUND OF THE INVENTION

There are various types of luminaires which have been designed for a variety of special purposes, such as, for example, for mounting on poles to provide street or parking lot illumination, on a wall to provide a specific pattern of illumination adjacent the wall, or on a ceiling to provide either direct or indirect lighting. There are also some luminaires which are promoted as being for general purpose lighting, but the degree of flexibility in mounting and light directivity is usually limited, thereby limiting the usefulness thereof.

It is desirable to be able to support a general purpose luminaire at one mounting point because that permits the greatest flexibility as to the direction. However, mountings of known types which permit this form of support are not capable of holding a luminaire of significant weight at a selected angular adjustment under adverse conditions of wind and vibration, or are extremely complicated to adjust.

BRIEF SUMMARY OF THE INVENTION

Accordingly, an objective of the present invention is to provide an improved adjustable knuckle which is capable of providing firm, solid support for a luminaire in any of a plurality of positions.

A further object is to provide such an adjustable knuckle which is simple to manufacture and easy to adjust, despite its firm hold once adjusted.

Yet another object is to provide a knuckle which is easily adjustable and which can be provided with a moisture-excluding seal to render the conductor passage substantially weatherproof.

Briefly described, the invention includes an adjustable support knuckle for a luminaire having a first body which is fixedly attached to the housing of the luminaire, the body being generally disk-like and having a generally cylindrical recess extending inwardly from one side with a hole extending coaxially from the recess to the other side. An axially facing peripheral shoulder partially encircles the recess and is adjacent the side from which the recess extends inwardly, and a first plurality of uniformly spaced teeth protrude axially from that shoulder, the space between the teeth being greater than the width of a tooth. The first body also includes a passageway extending from the recess to the interior of the luminaire housing. A second body can be coupled to the first body, the second body having a generally cylindrical portion with a circular wall having an outer diameter substantially equal to that of the shoulder on the first body. A second plurality of teeth protrude axially from the wall, the teeth being engageable with the teeth on the first body. A second recess extends axially into the second body within the wall and a hole extends from the recess to the other side coaxially with the recess. The second body has a tubular conduit which extends radially outwardly from the body, the conduit having means, such as external threads, for attachment to a mounting location. A fastener, such as a nut and bolt, can be passed through the holes in the first and second bodies for holding the bodies together with the teeth engaged in any of a number of possible relative angular positions, the first and second recesses together forming a chamber through which electrical wires can extend from the interior of the housing, through the chamber and through the conduit for connection at the mounting location. Finally, an elastomeric sleeve extends between the bodies within the recesses and surrounds the fastener to separate the fastener from the wires.

The two bodies additionally have annular surfaces surrounding the teeth and facing each other, the surfaces being located to receive a gasket, thereby sealing the interior chamber from ambient weather conditions.

In order that the manner in which the foregoing and other objects are attained in accordance with the invention can be understood in detail, a particularly advantageous embodiment will be described with reference to the accompanying drawings, which form a part of this specification, and wherein.

Figure 4:
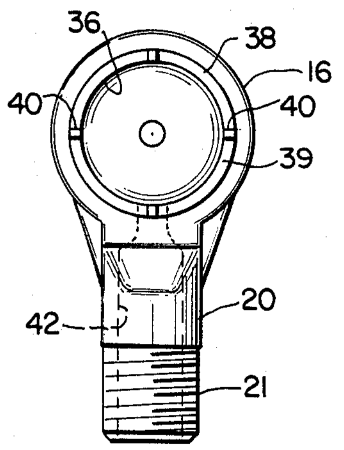
Figure 5:
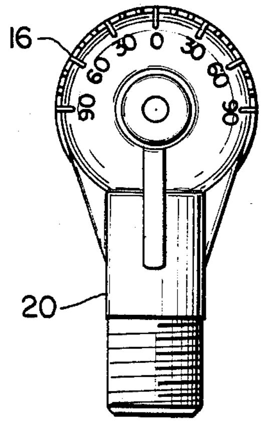

FIG. 4. is a left side elevation of a second portion of the knuckle apart from the first portion;

FIG. 5 is a right side elevation of the portion shown in FIG. 4; and

Figure 6:
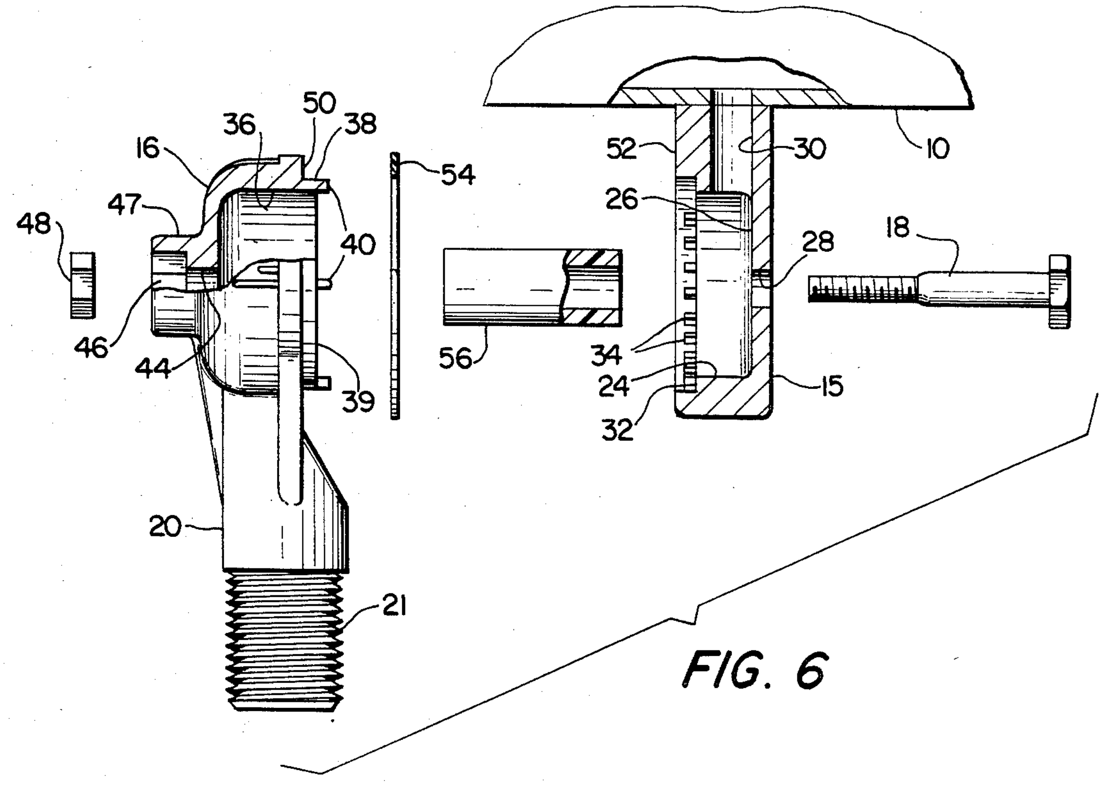

FIG. 6 is an exploded view of the knuckle components showing the interrelationship and manner of assembly.

DETAILED DESCRIPTION OF THE DRAWINGS

Figure 2:
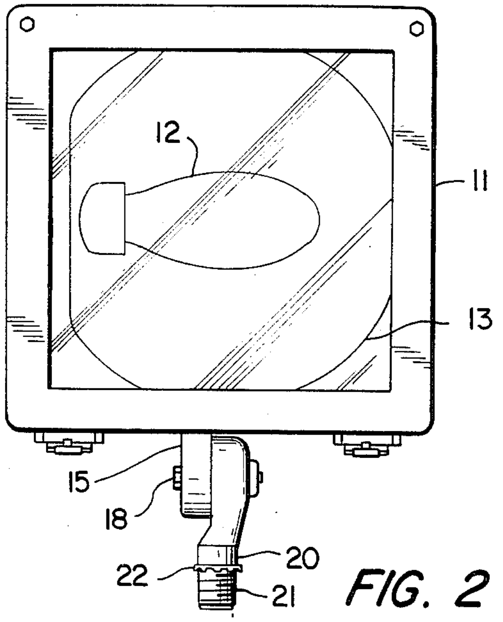
FIG. 2 is a front elevation of the luminaire and knuckle of FIG. 1.
Figure 1:
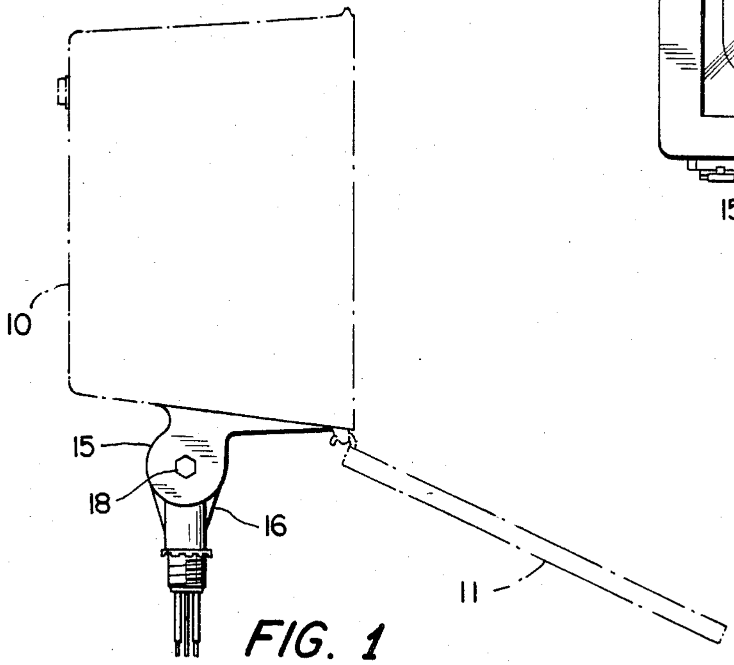
FIG. 1 is a right side elevation of a luminaire provided with a knuckle in accordance with the invention.

FIGS. 1 and 2 show, respectively, side and front views of a luminaire having a mounting knuckle in accordance with the invention for the purpose of illustrating the manner in which it is used. The luminaire itself includes a housing 10 and the particular variety shown has a front cover 11 which is hingedly attached to the housing for access to replace a lamp 12 or the reflector 13, or to perform other maintenance. The illustrated luminaire is of a type known as a floodlight luminaire. The majority of such luminaires used in this field are heavy, especially those which are ballasted. Because of the heat restrictions imposed by standards organizations, most outdoor luminaires, whether or not they are ballasted, utilize metal housings to dissipate the heat generated by the lamp and by a transformer if one is used. These metal housings also contribute to the weight.

These heavy floodlights are commonly supported with U-shaped brackets, sometimes referred to in the industry as trunnions. Certain forms of knuckles are also used on lighter luminaires, but those luminaires are not satisfactory because vibration and wind-loading cause the knuckles to slip, permitting the luminaire to lose its initial orientation. This is not only undesirable but can be dangerous if they hot luminaire comes in contact with a combustible wall.

Floodlights of the type shown in FIGS. 1 and 2 are mountable on a wall or on a pole or, in some circumstances, on a conductor trough. However, the particular mounting is not significant insofar as the present invention is concerned because the device can be employed in any of these situations.

Briefly, the knuckle of the invention includes a first body 15 which is fixedly attached to the lower surface of the housing 10 and is coupled to a second body 16 by a fastener means, such as a bolt 18. Body 16 includes a radially extending conduit portion 20 having conventional threads 21 and a box nut 22 for attachment to a junction box, pole or a trough.

Figure 3:
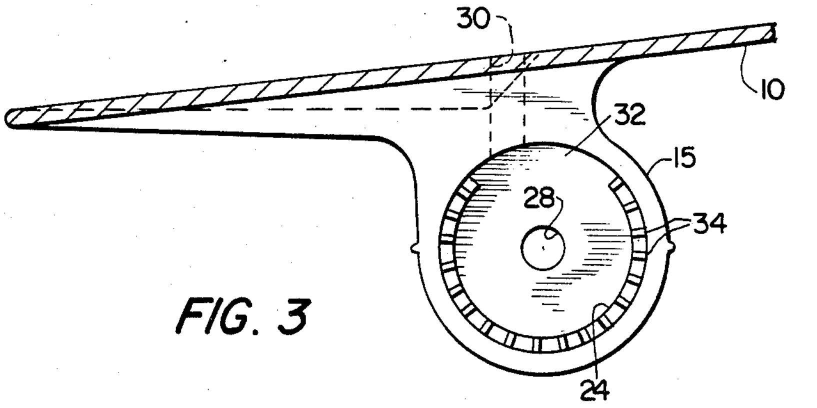
FIG. 3 is an enlarged left side elevation of a portion of the knuckle of FIGS. 1 and 2 which is fixedly attached to the luminaire.

The body 15 which is attached to housing 10 is shown in FIG. 3 with body 16 removed so that the interior of body 15 can be more clearly seen. In this connection, reference is also made to FIG. 6 which shows the body 15, in conjunction with the other components, in an exploded view. Body 15 includes an axially extending recess 24 which extends over halfway through the body, leaving a wall 26 which is penetrated by a coaxial hole 28 to receive bolt 18. A passageway 30 extends from the side of recess 24 upwardly to and through the wall of housing 10 so that electrical wires can be passed from the interior of the housing to the interior of recess 24.

Around a portion of the periphery of recess 24 is a larger, shallower recess forming a shoulder 32 which faces axially and which is provided with a plurality of teeth 34. The teeth 34 are uniformly distributed around approximately 270° of shoulder 32, the upper portion including 45° on either side of an approximate vertical line being left without teeth.

Body 16 can be more clearly seen in FIGS. 4 and 6 and also includes an axially inwardly extending recess 36, the open side of which is surrounded by a wall 38 having an axially facing surface 39. Four axially protruding teeth 40 extend from the surface of wall 38, teeth 40 being uniformly spaced apart by approximately 90°. The width of each tooth 40 is approximately the same as the width of each tooth 34, these widths being smaller than the spaces between teeth 34 on body 15.

As previously mentioned, conduit 20 extends generally radially away from body 16 and includes an interior passageway 42 through which wires can extend. At the back of recess 36 is a central, coaxial hole 44 which leads into a hexagonally shaped socket 46 surrounded by a protruding wall 47, socket 46 being shaped and dimensioned to receive a nut 48 and to prevent the nut from rotating while the threaded end of bolt 18 is being inserted.

Surrounding wall 38 is an annular flat surface 50, and a similar surface 52 is provided on body 15. As will be recognized, the recess defining shoulder 32 is substantially of the same diameter as the outer diameter of wall 38 so that when the components are assembled and teeth 40 engage teeth 34, surfaces 50 and 52 nearly abut each other. An annular gasket 54 of elastomeric material is provided to fit between surfaces 50 and 52 when the components are assembled to provide a seal between these surfaces and to prevent moisture from entering the recesses.

A sleeve 56 of an elastomeric material extends between openings 28 and 44 and surrounds bolt 18 when the components are assembled. Sleeve 56 performs, first, the function of providing an insulative separation between bolt 18 and the wires which can extend through the knuckle. Secondly, the length of sleeve 56 is slightly greater than the distance between the back walls of the recesses when the components are assembled such that recess 24 and recess 36 form a chamber. Thus, when bolt 18 is slightly loosened from nut 48, sleeve 56 urges the components away from each other, permitting the teeth to be disengaged so that one body can be rotated relative to the other without completely disassembling the device. Finally, sleeve 56 provides a weather seal, the opposite ends of the sleeve forming a seal against the portions of the body surrounding holes 28 and 44 to minimize the amount of moisture entering the chamber formed by the assembled recesses.

FIG. 5 shows an exterior view of body 16 from which it will be noted that the outer surface of the body can be provided with marks at, for example, 30° intervals, and these marks can be associated with indicia molded into the outer surface, permitting the bodies to be set at a particular predetermined angular relationship.

As will be recognized from the foregoing description, the body attached to the luminaire housing is provided with a large number of teeth which are engaged by at least three of the four teeth 40 on body 16, permitting the luminaire housing to be angularly adjusted relative to a mounting location, to which threads 21 are attached, in any one of a large number of angular positions. As previously mentioned, teeth 34 are separated by a distance greater than the tooth width which means that, even with the teeth engaged, there is a small amount of angular adjustment by slipping which remains possible. Thus, a rather fine adjustment can be accomplished without the provision of an extremely large number of very fine teeth which might present problems of strength. Normally, the bolt and nut arrangement, in conjunction with the springy action of sleeve 56, will maintain the established angular relationship. If slippage does occur, however, as a result of vibration and the like, the engaged teeth prevent significant movement from occurring. Preferably, teeth 34 are centered at 15° intervals and coincide with the marking on the outer surface of housing 16. Taking into account the width of teeth 40 and 34, about 5° of slippage adjustment is available. As will be recognized, when a floodlight luminaire of the type shown in FIGS. 1 and 2 is to be installed in a difficult location, the calibrations on body 16 permit angular adjustment and tightening of the components before installation. Also, as previously indicated, the wires from the interior of the luminaire housing extend through passage 30, through the chamber formed by recesses 24 and 36, and through passage 42 in conduit 20 to the interior of the junction box or the like on which the assembly is mounted, whereupon they can be electrically connected in a conventional manner.

The seal provided by gasket 54 and sleeve 56 effectively prevent entry of water so that the luminaire can be mounted in a position inverted from that shown in FIGS. 1 and 2, i.e., with the knuckle above rather than below housing 10.

While one advantageous embodiment has been chosen to illustrate the invention, it will be understood by those skilled in the art that various changes and modifications can be made without departing from the scope of the appended claims.

What I claim is:

1. An adjustable support knuckle for a luminaire comprising:

- a first body fixedly attached to the housing of said luminaire, said first body having
  - a generally cylindrical first recess extending inwardly from one side thereof,
  - a hole extending from the other side of said body through to said recess and coaxially therewith,
  - an axially facing peripheral shoulder adjacent said one side and at least partially encircling said recess, a first plurality of uniformly spaced teeth protruding axially from said shoulder, the space between said teeth being greater than a tooth width, and means defining a passageway from said recess to the interior of said luminaire housing;

a second body coupled to said first body, said second body comprising a generally cylindrical portion with a circular wall having an outer diameter substantially equal to that of said axially facing shoulder, a second plurality of uniformly spaced teeth axially protruding from said wall and being engageable between adjacent teeth of said first plurality of teeth, a second recess extending axially into said second body within said wall, a hole through said cylindrical portion coaxial with said recess and said wall, a tubular conduit extending generally radially from said generally cylindrical portion, and means on said tubular conduit for attachment to a mounting location;

fastener means insertable through said holes in said first and second bodies for holding said bodies together with said teeth engaged in any of a plurality of relative angular positions, said first and second recesses forming a chamber through which electrical wires can extend from said housing and into said conduit; and an elastomeric sleeve extending between said bodies within said recesses and surrounding said fastener means to separate said fastener means from said wires.

2. A knuckle according to claim 1, wherein each of said first and second bodies includes an axially facing annular surface radially outwardly of said teeth, said knuckle further including an annular gasket between said annular surfaces in sealing relationship when said bodies are coupled together.

3. A knuckle according to claim 2, wherein said second plurality of teeth consists of four teeth spaced substantially 90° apart, and said first plurality of teeth includes a substantially larger number extending around about 270° of the periphery of said recess.

4. A knuckle according to claim 3, wherein said fastener means is a threaded fastener, and said elastomeric sleeve has a normal length greater than the distance between the facing walls of said recesses when said bodies are fully coupled together, such that tightening said fastener axially and elastically deforms said sleeve, whereby said sleeve acts as a spring urging said bodies apart when said fastener is loosened, permitting angular repositioning of said bodies with minimum fastener loosening.

5. A knuckle according to claim 4, wherein said fastener means comprises a bolt and nut, and wherein one of said bodies includes a polygonally shaped cavity surrounding said hole to mate with said nut.

6. A knuckle according to claim 3, wherein said fastener means comprises a bolt and nut, and wherein one of said bodies includes a polygonally shaped cavity surrounding said hole to mate with said nut.

7. A knuckle according to claim 2, wherein said fastener means comprises a bolt and nut, and wherein one of said bodies includes a polygonally shaped cavity surrounding said hole to mate with said nut.

8. A knuckle according to claim 2, wherein said fastener means is a threaded fastener, and said elastomeric sleeve has a normal length greater than the distance between the facing walls of said recesses when said bodies are fully coupled together, such that tightening said fastener axially and elastically deforms said sleeve, whereby said sleeve acts as a spring urging said bodies apart when said fastener is loosened, permitting angular repositioning of said bodies with minimum fastener loosening.

9. A knuckle according to claim 1, wherein said fastener means is a threaded fastener, and said elastomeric sleeve has a normal length greater than the distance between the facing walls of said recesses when said bodies are fully coupled together, such that tightening said fastener axially and elastically deforms said sleeve, whereby said sleeve acts as a spring urging said bodies apart when said fastener is loosened, permitting angular repositioning of said bodies with minimum fastener loosening.

10. A knuckle according to claim 1, wherein said second plurality of teeth consists of four teeth spaced substantially 90° apart, and said first plurality of teeth includes a substantially larger number extending around about 270° of the periphery of said recess.

11. A knuckle according to claim 1 wherein the axial length of each tooth of said first plurality of teeth is less than the axial distance between said axially facing peripheral shoulder and said one side.

12. An adjustable support knuckle comprising the combination of a first body having a flat face, a first cylindrical recess extending inwardly from said face and terminating at a flat, annular shoulder, a second generally cylindrical recess extending inwardly from said shoulder, said second recess being concentric with said first recess, a first plurality of uniformly spaced teeth protruding axially from said shoulder toward said flat face, the axial length of each of said teeth being less than the depth of said first recess, and means defining a first radial passageway extending out of said second recess for receiving a wire;

a second body having an annular wall having an outer diameter dimensioned to be received in said first recess, a second plurality of uniformly spaced teeth axially protruding from said wall and being engageable between adjacent teeth of said first plurality of teeth, a third recess extending axially into said second body within said wall, means defining a second radial passageway extending out of said third recess for receiving a wire, and a flat, annular surface at least partially surrounding said wall; and means for holding said bodies together with said second and third recesses substantially coaxially facing each other to form a hollow chamber through which wires can pass from said first radial passageway to said second radial passageway.

13. A knuckle according to claim 12 wherein said means for holding said bodies together comprises a separable fastener extending axially through said chamber and into said bodies, said knuckle further comprises an elastomeric electrically insulating sleeve having a normal length greater than the distance between the facing bottom walls of said recesses when said bodies are fully coupled together, such that said sleeve is axially elastically deformed, whereby said sleeve acts as a spring urging said bodies apart when said fastener is loosened permitting disengagement of said teeth for angular repositioning of said bodies without complete separation of said bodies.

* * * * *